US009278441B2

(12) United States Patent
Sindelar

(10) Patent No.: US 9,278,441 B2
(45) Date of Patent: Mar. 8, 2016

(54) INSTALLATION TOOL FOR PIPE FITTINGS

(75) Inventor: Mark John Sindelar, Shaker Heights, OH (US)

(73) Assignee: LOKRING TECHNOLOGY, LLC, Willoughby, OH (US)

( * ) Notice: Subject to any disclaimer, the term of this patent is extended or adjusted under 35 U.S.C. 154(b) by 990 days.

(21) Appl. No.: 13/362,556

(22) Filed: Jan. 31, 2012

(65) Prior Publication Data

US 2012/0192393 A1 Aug. 2, 2012

Related U.S. Application Data

(60) Provisional application No. 61/437,983, filed on Jan. 31, 2011.

(51) Int. Cl.
*B23P 19/04* (2006.01)
*B25B 27/10* (2006.01)

(52) U.S. Cl.
CPC ............ *B25B 27/10* (2013.01); *Y10T 29/5367* (2015.01)

(58) Field of Classification Search
CPC ............................ B25B 27/10; Y10T 29/5367
USPC ........ 29/237, 516, 525, 508, 238.5, 521, 417, 29/520, 252; 72/417
See application file for complete search history.

(56) References Cited

U.S. PATENT DOCUMENTS

| | | | | |
|---|---|---|---|---|
| 3,019,520 | A * | 2/1962 | Woolley | B21D 39/04 29/234 |
| 3,769,678 | A * | 11/1973 | Marsden | 72/412 |
| 4,189,817 | A | 2/1980 | Moebius | |
| 4,726,284 | A * | 2/1988 | Green | 92/128 |
| 5,305,510 | A | 4/1994 | Croft et al. | |
| 5,402,560 | A * | 4/1995 | Rode | B25B 27/064 29/252 |
| 5,694,670 | A | 12/1997 | Hosseinian et al. | |
| 6,266,860 | B1 * | 7/2001 | Kiebler | 29/259 |
| 6,434,808 | B1 | 8/2002 | McKay | |
| 6,505,659 | B1 * | 1/2003 | Hummel | B27C 5/02 144/135.2 |
| 6,618,919 | B1 | 9/2003 | McKay | |
| 7,337,514 | B2 | 3/2008 | McKay | |
| 7,984,538 | B2 | 7/2011 | McKay | |
| 8,720,318 | B2 * | 5/2014 | Fukano et al. | 92/167 |
| 8,739,376 | B1 * | 6/2014 | Vidmar | 29/256 |
| 2003/0103856 | A1 * | 6/2003 | Amburgey | 418/48 |
| 2005/0183258 | A1 * | 8/2005 | McKay | B25B 27/10 29/468 |

(Continued)

OTHER PUBLICATIONS

Phastite® Tube Connectors Catalog, Parker, 2008, See pp. 28-30.

*Primary Examiner* — Monica Carter
*Assistant Examiner* — Mahdi H Nejad
(74) *Attorney, Agent, or Firm* — Pearne & Gordon LLP

(57) ABSTRACT

A hydraulic installation tool comprises a fixed jaw, a movable, and a plurality of independent hydraulic cylinders each comprising a piston. Movement of the pistons in a first direction moves the movable jaw toward the fixed jaw. A plurality of guide rods comprises a first end secured to the fixed jaw. A plurality of retaining members are each removably coupled to an associated one of the plurality of guide rods about the second end. The movable jaw is disposed between the fixed jaw and the plurality of hydraulic cylinders for movement along the guide rods. Each hydraulic cylinder is independently removable from the associated guide rod upon removal of the associated retaining member from said guide rod. In one example, the fixed and movable jaws are configured to engage and axially force a swage ring onto a fitting body to connect and seal the fitting body to a fluid conduit.

16 Claims, 9 Drawing Sheets

(56) References Cited

U.S. PATENT DOCUMENTS

2006/0059677 A1* 3/2006 McKay ................ B21D 39/046
29/516
2007/0248435 A1* 10/2007 Hirotomi .............. F16B 41/005
411/166
2009/0256050 A1* 10/2009 Huang ..................... A47C 3/30
248/631
2011/0017681 A1* 1/2011 Bibey et al. ................... 210/791
2013/0168623 A1* 7/2013 Jacobs .................... B66F 11/00
254/93 R

* cited by examiner

INSTALLATION TOOL FOR PIPE FITTINGS

CROSS-REFERENCE TO RELATED APPLICATIONS

This application claims the benefit of U.S. Provisional Application No. 61/437,983, filed Jan. 31, 2011, the entire disclosure of which is hereby incorporated herein by reference.

FIELD OF THE INVENTION

The present invention relates generally to installation tooling, and more particularly, to hydraulic installation tooling for pipe fittings.

BACKGROUND OF THE INVENTION

Generally, one type of fitting for fluid conduits, such as tubes or pipes, includes a connector body that fits loosely over the fluid conduit and a swage ring which compresses and/or physically deforms the connector body against the outside surface of the fluid conduit to provide one or more seals and to provide a strong mechanical connection.

Prior art tools for assembling such a fitting to a fluid conduit often include a fixed jaw, a movable jaw and one or more hydraulic cylinders for moving the movable jaw toward the fixed jaw. The jaws can be configured to grip the swage ring and the connector body such that, upon actuation, the jaws forcibly move the swage ring over the connector body thereby causing the connector body to compress or move radially into the fluid conduit to provide a seal and a mechanical connection. When the swaging is complete, hydraulic pressure in the one or more hydraulic cylinders is reduced to allow the tool to be removed from the fitting. Examples of prior art installation tools are taught in U.S. Pat. No. 4,189,817 ("Hydraulic Assembly Tool for Tube Fittings"); U.S. Pat. No. 5,305,510 ("Hydraulic Assembly Tool with Improved Load Bearing Arrangement for Tube Fittings"); U.S. Pat. No. 5,694,670 ("Secure Swaging Tool"); U.S. Pat. No. 6,434,808 ("Compact Installation Tool"); and U.S. Pat. No. 6,618,919 ("Remote Actuation of Installation Tooling Pump"); and U.S. Pat. No. 7,337,514 ("Hydraulic Hand Tool"), all expressly incorporated herein by reference.

Many prior art installation tools receive hydraulic power via a hydraulic fluid pumped through a hydraulic hose assembly from a remotely positioned hydraulic pressure supply. The hydraulic pressure supply can include a pump and an electric motor for driving the pump.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect, a hydraulic installation tool comprises a fixed jaw, a movable jaw movable relative to the fixed jaw, and a plurality of independent hydraulic cylinders each comprising a piston configured to engage the movable jaw. Movement of the pistons in a first direction moves the movable jaw toward the fixed jaw. A plurality of guide rods comprises a first end and a second end, the first end being secured to the fixed jaw, and the movable jaw disposed between the fixed jaw and the plurality of hydraulic cylinders for movement along the guide rods. A plurality of retaining members are each removably coupled to an associated one of the plurality of guide rods about the second end. Each hydraulic cylinder is independently removable from the associated guide rod upon removal of the associated retaining member from said guide rod.

In accordance with another aspect, a hydraulic installation tool for advancing a fitting's swage ring onto a fitting's connector body while a conduit is received in the connector body to mechanically and sealingly connect the fitting to the conduit comprises a fixed jaw and a movable jaw movable relative to the fixed jaw. A plurality of independent and self-contained hydraulic cylinders each comprises a piston configured to engage the movable jaw, movement of the pistons in a first direction moving the movable jaw toward the fixed jaw. A plurality of guide rods comprises a first end secured to the fixed jaw and a second end configured to receive one of the hydraulic cylinders. The movable jaw is disposed between the fixed jaw and the plurality of hydraulic cylinders for movement along the guide rods. A plurality of retaining members are each removably coupled to an associated one of the plurality of guide rods about the second end. Each hydraulic cylinder is independently removable from the associated guide rod upon removal of the associated retaining member from said guide rod.

In accordance with another aspect, a hydraulic installation tool for advancing a fitting's swage ring onto a fitting's connector body while a conduit is received in the connector body to mechanically and sealingly connect the fitting to the conduit comprises a fixed jaw and a movable jaw movable relative to the fixed jaw. A plurality of independent hydraulic cylinders each comprises a piston configured to engage the movable jaw, movement of the pistons in a first direction moving the movable jaw toward the fixed jaw. A plurality of guide rods comprises a first end secured to the fixed jaw and a second end configured to receive one of the hydraulic cylinders. The movable jaw is disposed between the fixed jaw and the plurality of hydraulic cylinders for movement along the guide rods. A plurality of retaining members are each removably coupled to an associated one of the plurality of guide rods about the second end. Each hydraulic cylinder is independently removable from the associated guide rod upon removal of the associated retaining member from said guide rod. The first end of each guide rod remains secured to the fixed jaw when the associated hydraulic cylinder is independently removed from said guide rod.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
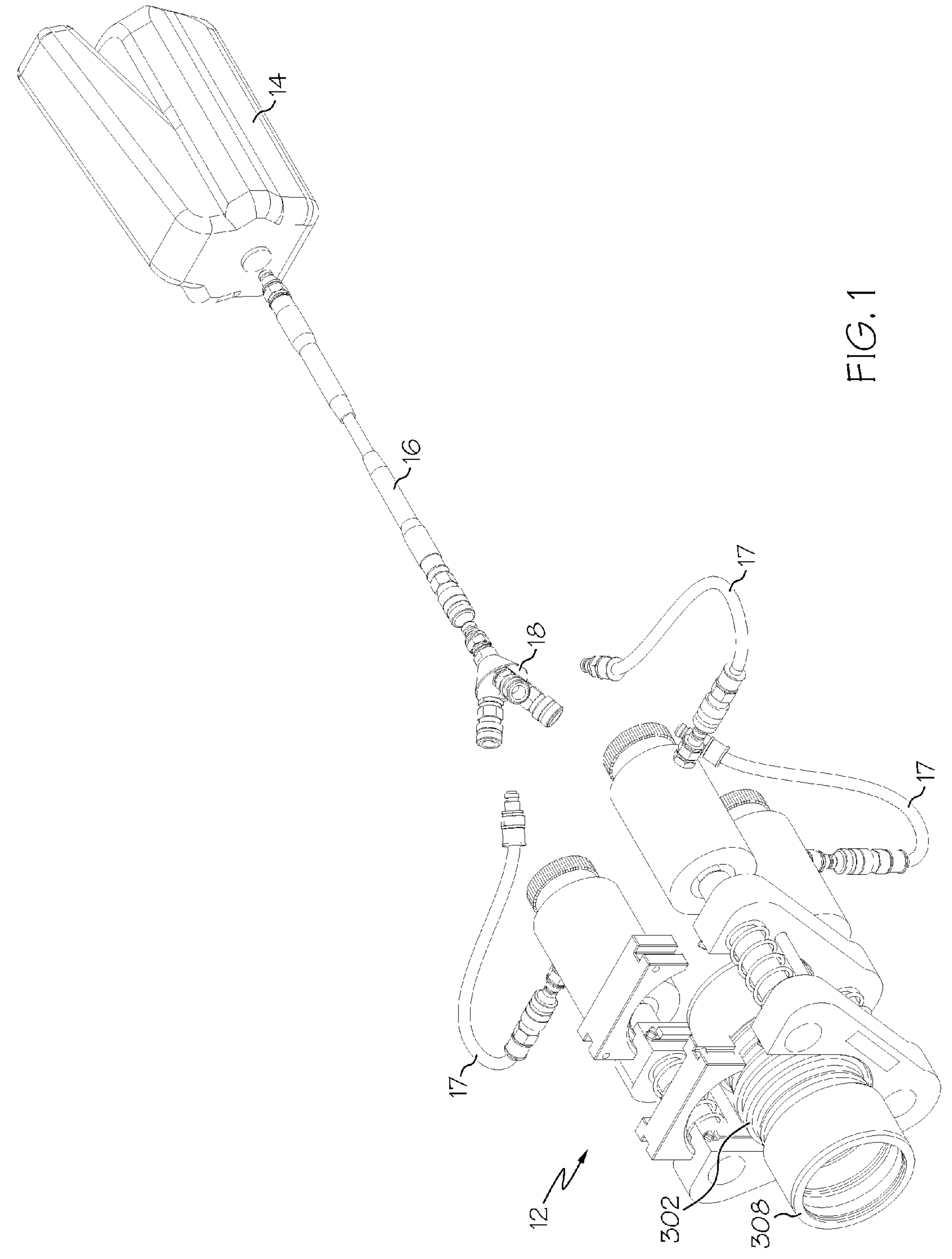
FIG. 1 is a perspective view, partially exploded, of an example installation tool.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to the shown example of FIG. 1, a hydraulic installation tool for installing swage ring fittings is generally designated by reference numeral 12. The installation tool 12 is adapted to connect a fitting and a fluid conduit together as will be described in more detail below. More particularly, the installation tool 12 can be used to axially move or advance a fitting's swage ring over or onto a connector body of the fitting while or when a fluid conduit is inserted or received therein to compress or plastically deform the connector body radially against an outside surface of the fluid conduit which creates one or more seals and mechanically connects the connector body to the fluid conduit. The installation tool 12 can be fluidly connected to a hydraulic source 14 by a hose assembly.

In the illustrated embodiment, the hydraulic source 14 is a remotely positioned hydraulic pump, which can be driven by a hand pump or electric motor (not shown), that provides hydraulic power or pressure to the installation tool 12 through a hydraulic fluid. In one embodiment, the pump 14 can be driven by an electric motor as is generally known by those skilled in the art. "Remotely positioned" refers to the relative spacing between the installation tool 12 and the pump 14 (i.e., the pump 14 and the installation tool 12 are spaced apart) that is traversed by the hydraulic hose assembly. Alternatively, hydraulic pressure could come from any number of power sources including, for example, electric-over-hydraulic, air-over-hydraulic or even a hand pump.

The installation tool 12 is fluidly connected to the remote hydraulic pressure supply pump 14 through a multi-hose assembly. The hydraulic hose assembly includes a main hydraulic hose 16 (which may comprise a single hose or multiple hoses coupled together) with a multi-connector manifold 18 to provide pressurized hydraulic fluid to multiple hydraulic cylinders of the installation tool 12. Each hydraulic cylinder is fed from a separate hydraulic hose 17 connected between the multi-connector manifold 18 and input ports 19 on the hydraulic cylinders. In the typical hose assembly of prior art installation tool assemblies, the separate hydraulic hoses 17 are each about 5 feet (1.524meters) long. The main hydraulic hose 16 is generally an elongated flexible hose of about 15 feet (4.572 meters) long in the illustrated example, though it is understood that various lengths can be used. Conventional male/female quick disconnects are provided on each of the hydraulic cylinders and each end of the hoses for making readily disconnectable fluid connections between the aforementioned components. The use of the multi-connector manifold 18 with elongated hoses 17 of about equal length is generally expected to ensure that all of the hydraulic cylinders operate substantially simultaneously upon generation of hydraulic pressure of a hydraulic fluid by the pump 14.

Figure 2:
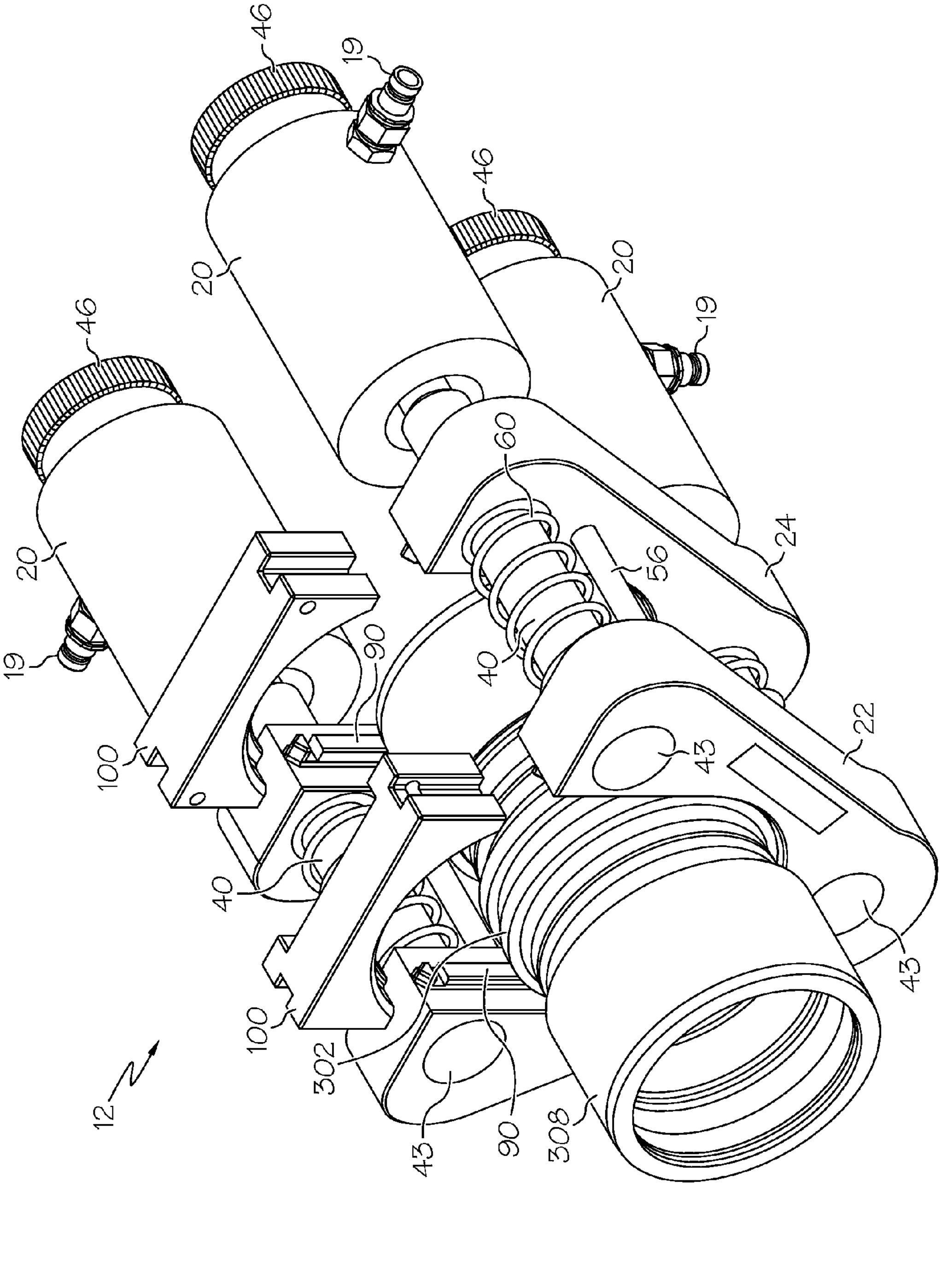
FIG. 2 is a detail perspective view of the example installation tool of FIG. 1.
Figure 3:
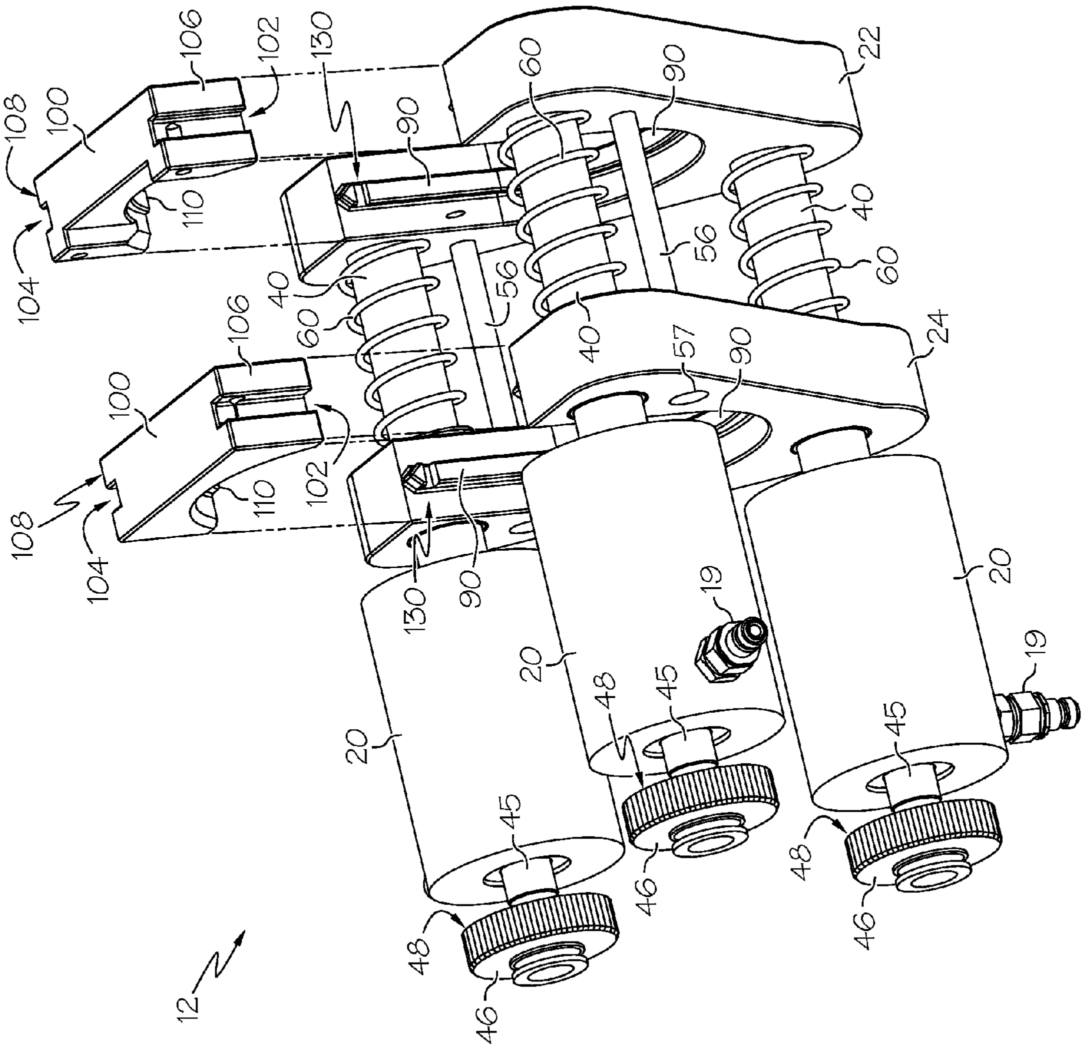
FIG. 3 is similar to FIG. 2, but illustrates a rear perspective view.

Turning now to FIGS. 2-3, the installation tool 12 includes a plurality of hydraulic cylinders 20 secured to a fixed jaw 22, and a movable jaw 24 that is selectively movable toward the fixed jaw 22. As will be described in more detail below, the hydraulic cylinders 20 are adapted to receive hydraulic power via a hydraulic fluid pumped through the hose assembly from the hydraulic source 14 for purposes of forcibly moving the movable jaw 24 toward the fixed jaw 22. Handles, grips, hooks, and the like (not shown) can be mounted to the fixed and/or movable jaws 22, 24 for ease of transporting the installation tool 12 and providing a support structure for supporting the installation tool assembly when resting on an underlying surface and/or being supported from an overhead support.

Figure 5:
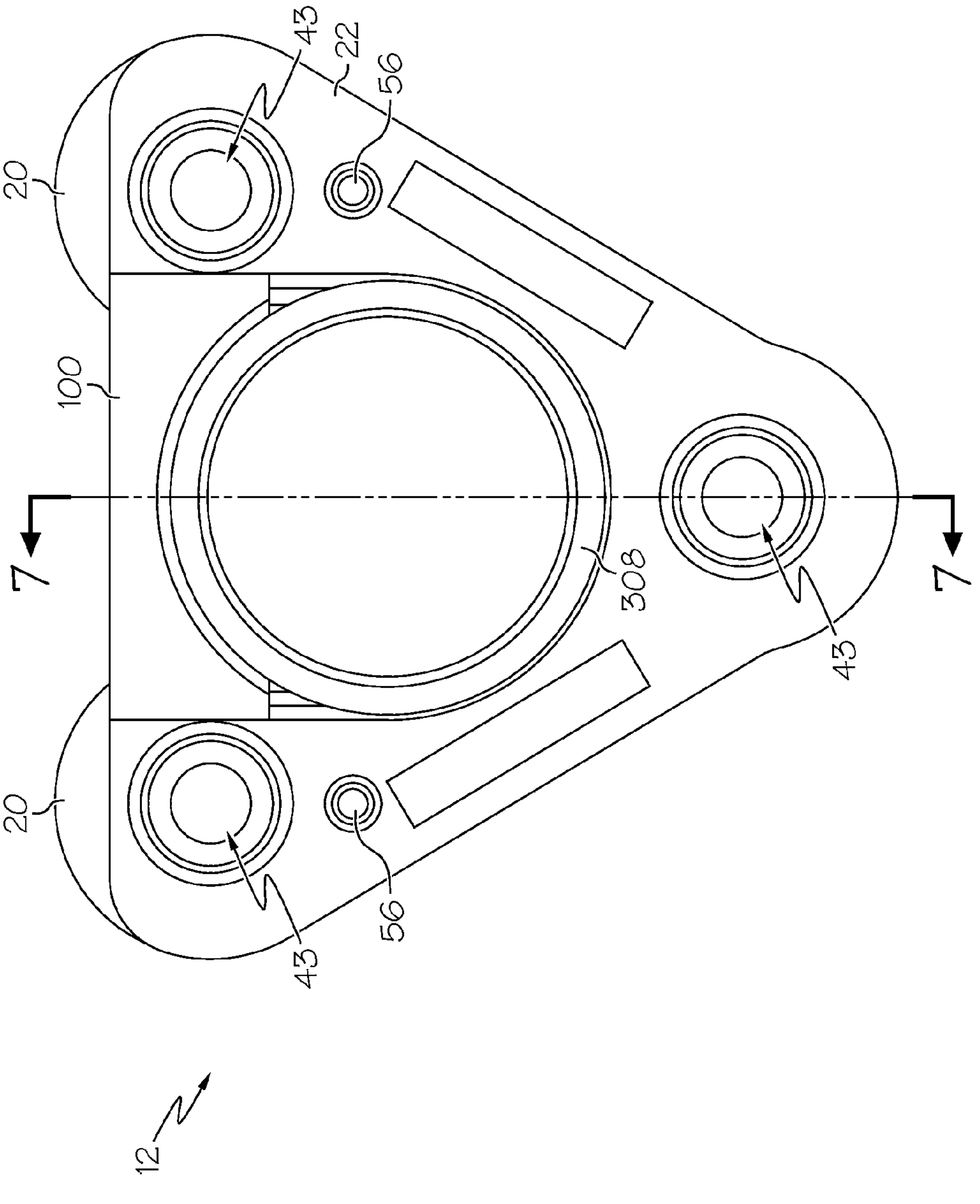
FIG. 5 is a front view of the example installation tool.

Turning briefly to FIG. 5, the fixed and movable jaws 22, 24 can have a generally V-shaped geometry that can reduce the weight and/or space requirements of the tool 12. In the shown example, three hydraulic cylinders 20 can be utilized with the tool 12 and arranged in a generally triangular configuration, though it can be understood that various numbers of hydraulic cylinders 20 can be utilized, such as four, five, six, or even more. The three hydraulic cylinders 20 can be arranged in an equilateral triangle, isosceles triangle, or even an unequal triangle. Still, the V-shaped geometry can still enable the installation tool 12 to be used with wide range of swage fittings, such as 1-3" diameter swage fittings, or even relatively large swage fittings, such as up to 4", 6", 8" diameter swage fittings (or even greater). Moreover, the V-shaped geometry can be scaled in size and strength to correspond to the relatively larger or smaller diameter swage fittings and/or number of hydraulic cylinders.

Turning back to FIGS. 2-3, the fixed and movable jaws 22, 24 are specifically configured for engaging the connector body of a swage ring fitting and the swage ring of the swage ring fitting to mechanically and sealingly connect the fitting to a conduit. More particularly, as discussed in more detail below, the fixed and movable jaws 22, 24 are configured to grip the fitting's swage ring 300 and connector body 302 such that, upon movement of the movable jaw toward the fixed jaw as caused by the hydraulic fluid, the fixed and movable jaws 22, 24 forcibly move the swage ring over the connector body thereby causing the connector body to compress or move into the fluid conduit to seal and mechanically connect thereto.

Figure 7:
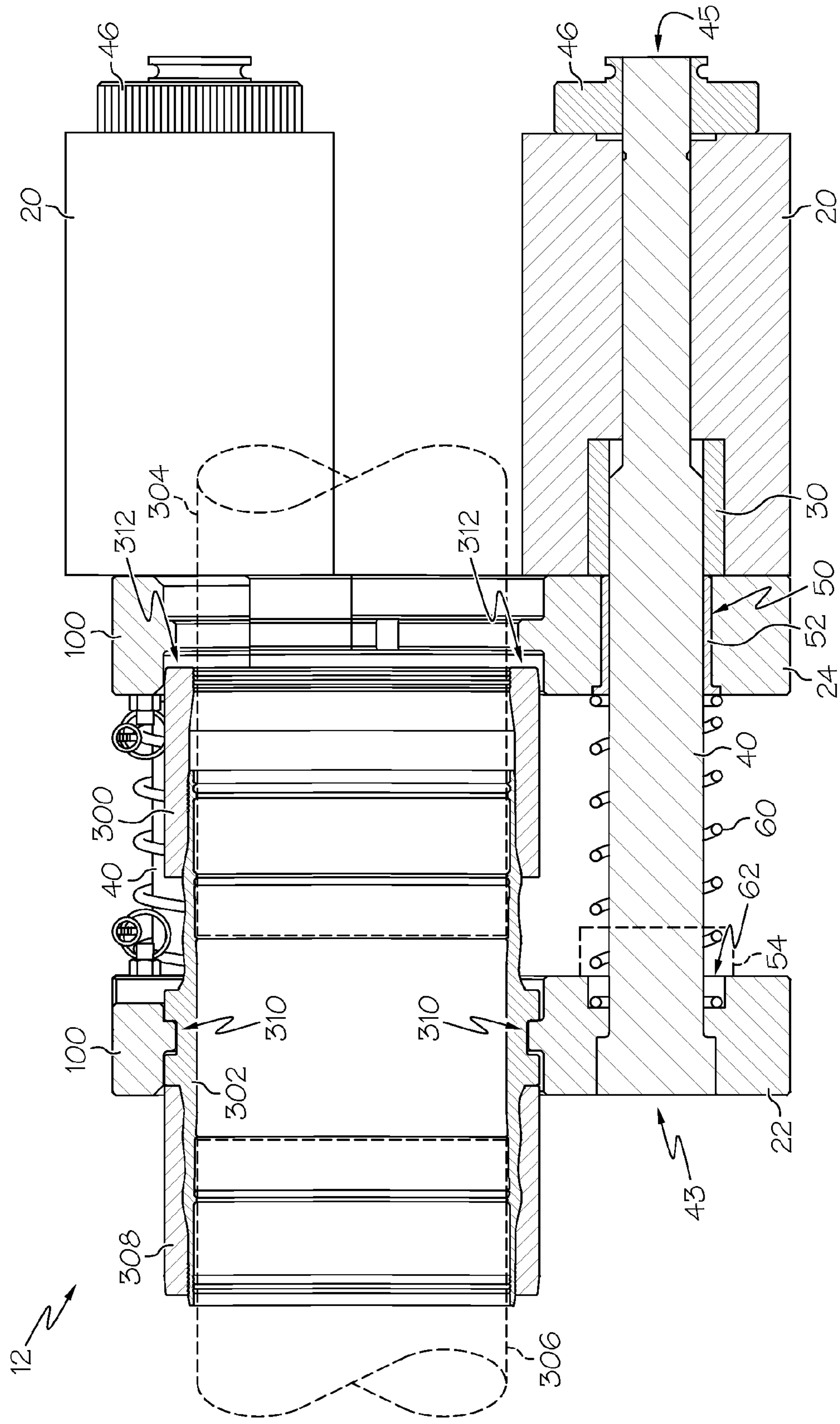
FIG. 7 is a sectional view taken along line 7-7 of FIG. 5.
Figure 8:
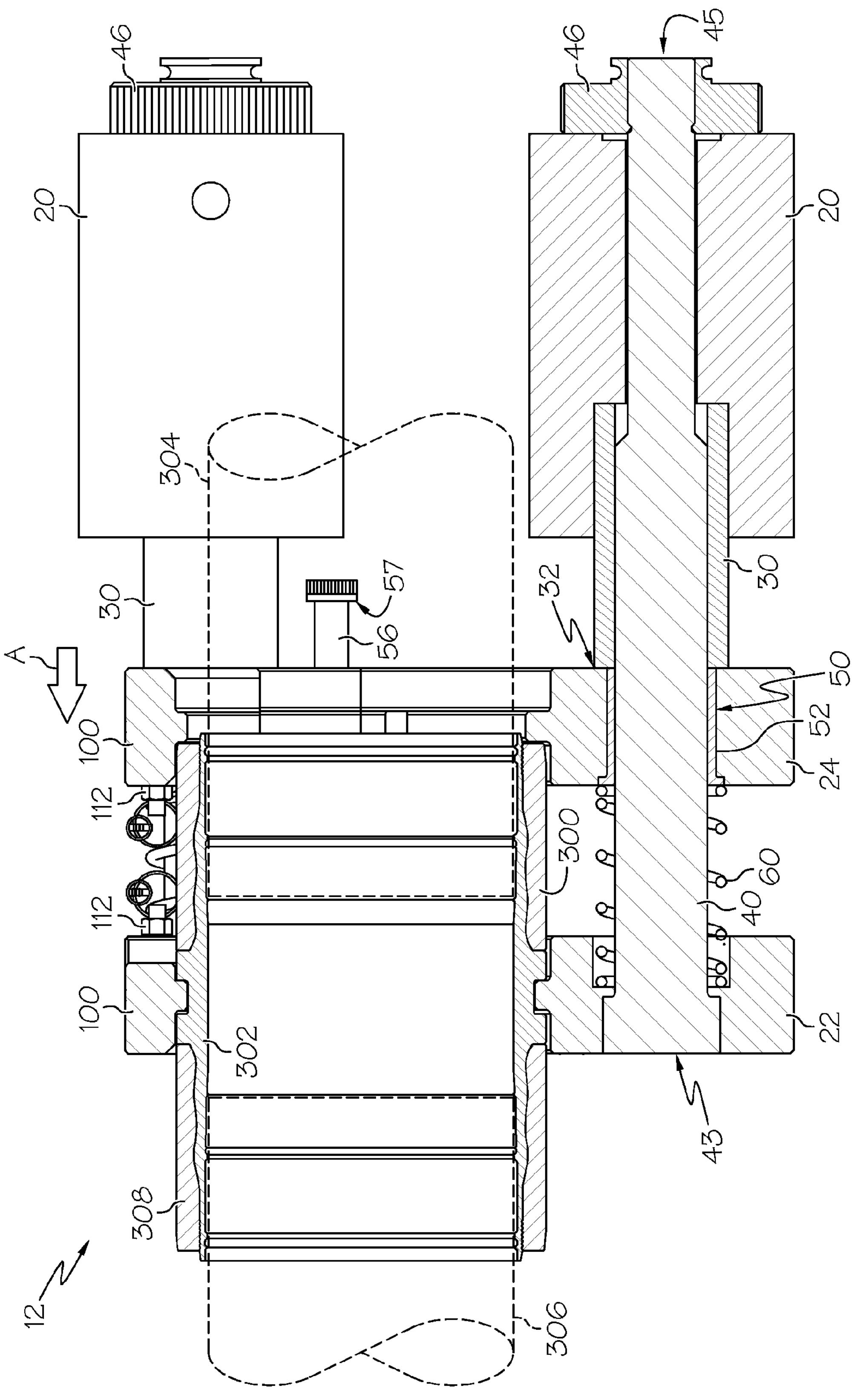
FIG. 8 is similar to FIG. 7, but illustrates the example installation tool in an example operation.
Figure 9:
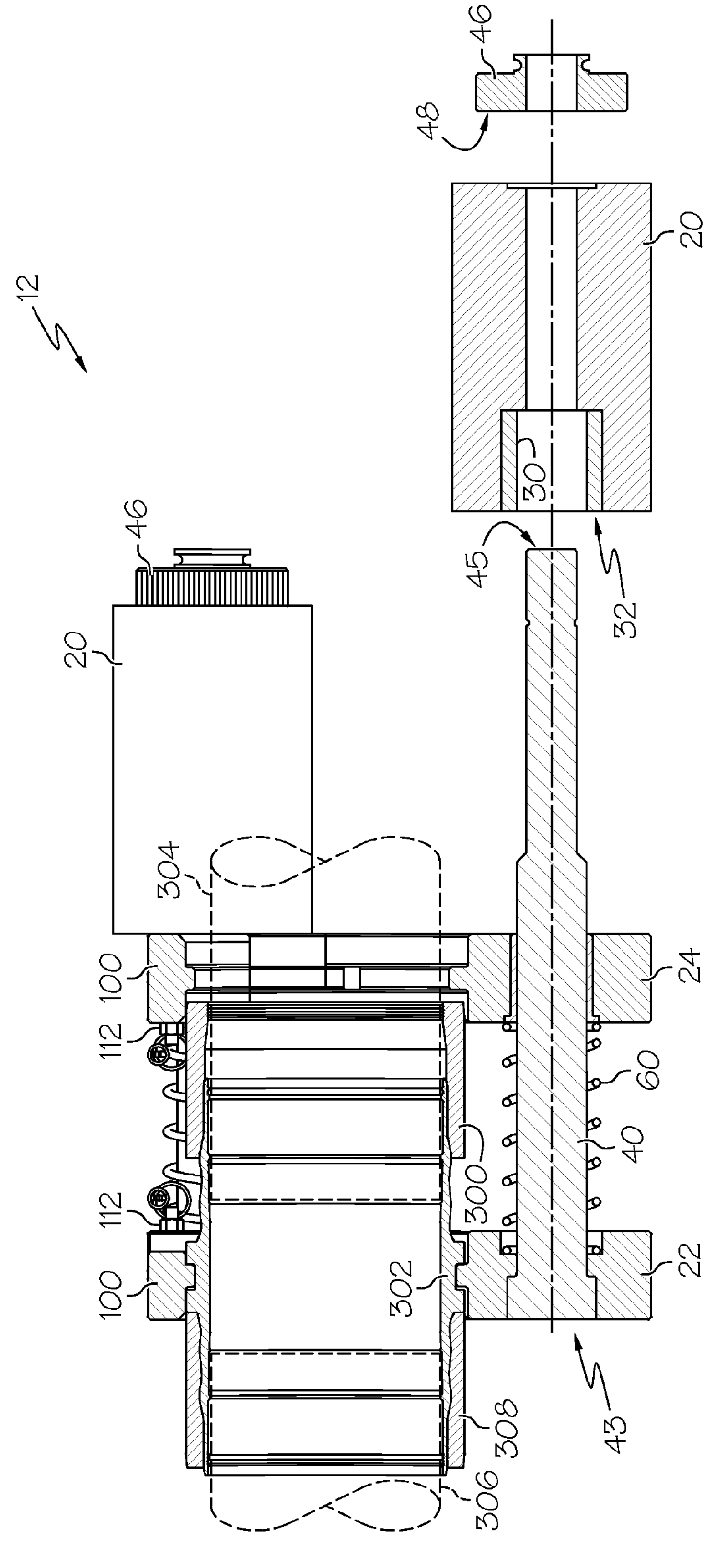
FIG. 9 is similar to FIG. 7, but illustrates a partially exploded view.

Various types of hydraulic cylinders 20 can be utilized. In one example, the hydraulic cylinders 20 can be of the hollow plunger type wherein a central bore extends through the body of the hydraulic cylinder 20. The hydraulic cylinders 20 can have various load ratings and operating capacities, such as providing 20-100 tons of force at a maximum operating pressure of about 10,000 psi (pounds per square inch), though it is understood that various other ratings and operating capacities are contemplated. As shown in FIGS. 7-9, each hydraulic cylinder 20 comprises a piston 30 movable via the hydraulic fluid. The hollow body bore that extends through the hydraulic cylinder 20 can similarly extend though each associated piston 30. It is understood that the pistons 30 are shown schematically for clarity. Seals (not shown) are provided about each of the pistons 30 for sealing purposes, i.e., to prevent hydraulic fluid from escaping from the chambers and to prevent debris from entering the chambers. Still, it is understood that some or all of the hydraulic cylinders may not be of the hollow plunger type. For example, a combination of hollow plunger and solid plunger hydraulic cylinders may be used. Guide rods may not be provided for some of the hydraulic cylinders.

The fixed jaw 22 is oriented with respect to the hydraulic cylinders 20 by a plurality of elongated members or guide rods 40. The guide rods 40 are generally elongated shafts having a first end 43 secured to the fixed jaw 22, and a second end 45 fixed with respect to the hydraulic cylinders 20. In one example, the first end 43 can be non-removably secured to the fixed jaw 22, such as press fit into corresponding apertures of the fixed jaw 22. Alternatively, the guide rods 40 could be welded or even formed with the fixed jaw 22. In another example, the first end 43 can be removably secured to the fixed jaw 22, such as threaded and secured to the fixed jaw 22 via a nut or the like.

As described above, each hydraulic cylinder 20 and piston 30 is of the hollow type and permits a portion of an associated guide rod 40 to extend therethrough. Thus, the piston 30 of the hydraulic cylinder 20 can have an internal diameter slightly larger than the outer diameter of the portion of the guide rod 40 that extends therethrough, providing a relatively tight tolerance fit. In one example, the portion of the guide rod 40 that extends through the piston 30 may or may not have a reduced diameter. Similarly, the piston 30 can also have an outer diameter relatively larger than the outer diameter of the guide rod 40. Thus, the piston 30 can have an operating face 32 (see FIGS. 7-8) for engagement with the movable jaw 24 to apply a motive force thereto.

Turning briefly to FIG. 9, the second end of the guide rod 45 can be inserted into and through the hydraulic cylinder 20. As such, this feature provides the installation tool 12 with a modular design to independently assemble the various parts of the tool 12 at various locations, and/or independently repair or replace the various parts independently of the remaining parts. For example, one or more of the hydraulic cylinders 20 can be completely removable from the installation tool 12. As shown in FIG. 8, the hydraulic cylinders 20 can be arranged coaxial with and slidable onto the guide rods 40 along a central longitudinal axis generally along the same direction as arrow A. In one example, all of the hydraulic cylinders 20 can be removable from the installation tool 12 to thereby greatly reduce the size and weight of the tool 12 to facilitate moving, positioning, and installation about a pipe fixture to be worked on. Indeed, any or all of the parts of the installation tool 12, aside from the core portion of the tool comprising the fixed and movable jaws 22, 24 and guide rods 40, can be independently removable by the user. Removal of one or more of the parts, such as the hydraulic cylinders 20 and retaining nuts 46, hydraulic lines 16, 17, pump 14, etc., can permit the tool 12 to be assembled on-site by a single user and/or facilitate maintenance. In addition or alternatively, different ones of the hydraulic cylinders 20 can be replaced for substitute ones of different loading capacities to better match the swage fixture to be installed. For example, the hydraulic cylinders 20 may be replaced for larger loading capacities to permit installation of relatively larger swage fixtures, or even replaced for smaller loading capacities to reduce the overall size and/or weight of the tool where smaller swage fixtures are being installed.

Figure 6:
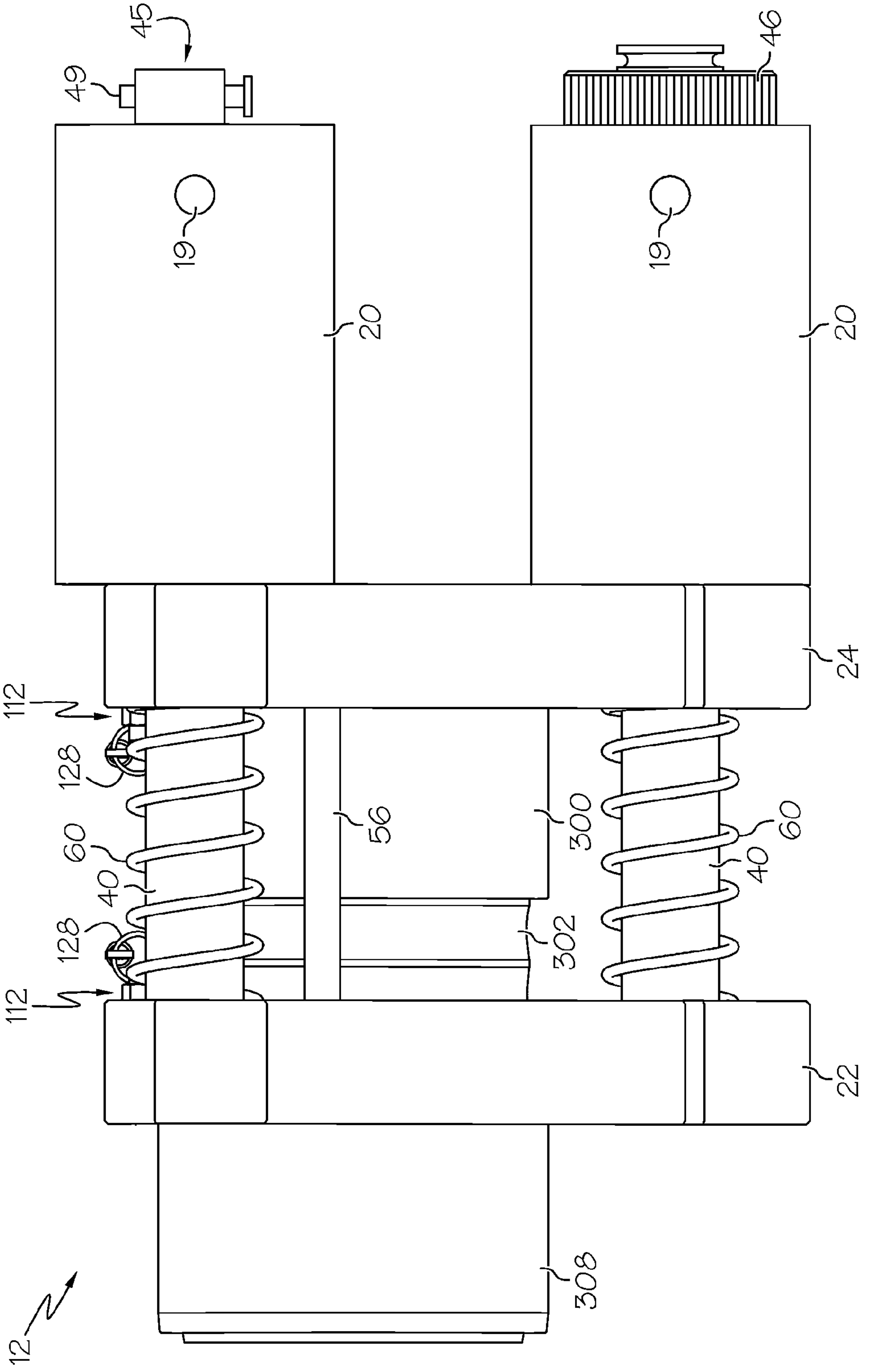
FIG. 6 is a side view of the example installation tool.

The second end 45 of the guide rod 40 can be inserted into, through, and fixed relative to the hydraulic cylinders 20 via a retaining member in various manners. In one example, the retaining member can comprise a threaded retaining nut 46. The second end 45 of the guide rods 40 can be threaded and configured to receive the correspondingly-threaded retaining nut 46 or the like. The retaining nut 46 can include a knurled (or similar) outer surface for gripping by the user to facilitate installation onto the second end 45 of the guide rod 40, and can be hand tightened in place. In addition or alternatively, the retaining nut 46 can have structure for engagement with a tool, such as a hex-head, square head, or the like. The retaining nut 46 can also include a surface 48 for abutment with a portion of the associated hydraulic cylinder 20 to effectively retain and/or clamp the hydraulic cylinder 20 between the retaining nut 46 and the movable jaw 24. Either or both of the second end 45 of the guide rod 40 and the retaining nut 46 can provide indicia indicating a desired amount of threaded engagement therebetween for a secure fit with respect to the expected force or loading of the hydraulic cylinder 20. In addition or alternatively, the retaining member could comprise a clevis pin 49 or the like (see FIG. 6, only one pin shown schematically) insertable at least partially into or through the guide rods 40 to provide a similar retention feature. The clevis pin 49 should be designed to provide sufficient shear strength to resist the expected force or loading of the hydraulic cylinder 20.

The guide rods 40 additionally serve to provide guidance to the movable jaw 24 (i.e., the guide rods 40 provide a track along which the movable jaw 24 is movable). As illustrated, the guide rods 40 generally extend from the fixed jaw 22 in parallel relation to the movement of the pistons 30 of the hydraulic cylinders 20. More particularly, the movable jaw 24 includes apertures 50 through which the guide rods 40 are received. Thus, the movable jaw is disposed along the guide rods 40 between the fixed jaw 22 and the hydraulic cylinders 20 for movement therealong. Bushings 52 are optionally positioned in the apertures 50 radially between the movable jaw 24 and each of the guide rods 40 for guiding movement of the movable jaw 24 along the guide rods 40. The bushings 52 can include sleeve portions and radial head portions. The radial head portions can be positioned variously, such as towards the fixed jaw 22. Alternatively, although not shown, the radial head portions could be disposed between the movable jaw 24 and the hydraulic cylinders 20 thereby maintaining a slightly spaced relation to one another.

Optionally, spacers 54 or stops (see FIG. 7, only one spacer shown schematically) can be fixedly secured to the fixed jaw 22 and/or the guide rods 40 adjacent the fixed jaw 22 for purposes of providing or forming a travel stop against the moving jaw 24, particularly when the moving jaw is advancing toward the fixed jaw without an associated fitting therebetween. Threaded members or set screws can be employed to fixedly secure the spacers in the appropriate location on the guide rods 40 adjacent the fixed jaw 22. In operation, when the moving jaw 24 is approaching the fixed jaw 22, particularly when no associated fitting is provided between the jaws 22, 24, the stops 54 engage the moving jaw 24 and prevent further movement toward the fixed jaw 22.

A mechanical force for swaging a fitting received between the jaws 22, 24 comes from the pistons 30. More particularly, hydraulic fluid chambers are formed about each of the pistons 30 for receiving hydraulic fluid from the hydraulic pressure source. When sufficient hydraulic fluid is received in the chamber portions, the pressurized hydraulic fluid forcibly moves the pistons 30 in the direction of the fixed jaw 22 (e.g., see Arrow A in FIG. 8) and thereby forcibly moves the movable jaw 24 toward the fixed jaw 22. The hydraulic fluid enters each of the hydraulic cylinders 20 from the input ports 19. Thus, the fluid input ports 19 are fluidly connected to the hydraulic source 14.

Springs 60 are disposed between the fixed and movable jaws 22, 24 and urge the pistons 30 in a direction opposite the hydraulic force to thereby generally urge the movable jaw 24 toward a first position wherein it is positioned adjacent the hydraulic cylinders 20. In one example, a spring 60 can be located about each of the guide rods 40, such as received on the respective guide rods, though it is understood that more or less could be used. For example, each spring 60 can be at least partially received in respective bores 62 of the fixed jaw 22 (and/or the movable jaw 24). Thus, when no or an insufficient hydraulic force is applied to the pistons 30, the springs 60 urge or move the tool movable portion (i.e., movable jaw 24) toward the hydraulic cylinders 20. In this manner, the tool 12 is a self-retracting tool that may not rely upon any retraction springs that may be built into the hydraulic cylinders 20. Only when a hydraulic force is applied to the pistons 30 that is sufficient to overcome the urging of the springs 60 is the movable jaw 24 urged or moved toward the fixed jaw 22. In addition or alternatively, where different size hydraulic cylinders 20 are substituted based upon an expected working load, it is possible to replace one or more of the springs 60 with different ones that can provide a different spring force suited to retract the substituted hydraulic cylinders 20.

In addition or alternatively, one or more shoulder bolts 56 or the like can be provided to limit the separation distance between the fixed and movable jaws 22, 24 by the springs 60. For example, one or more shoulder bolts 56 (two are shown) can have one end secured to the fixed jaw, such as by a press fit, threaded engagement, or nut. The main body of the shoulder bolt 56 can slidingly extend through the movable jaw 24. The other end of the shoulder bolt 56 can be relatively free from the movable jaw 24 and can comprise a shoulder surface 57 for abutment with a surface of the movable jaw 24. Thus, when the springs 60 force the movable jaw 24 away from the fixed jaw 22, the amount of travel of the movable jaw 24 will be limited by abutment with the shoulder surface 57. In this manner, the interaction between the springs 60 and the shoulder bolts 56 can size the core portion of the tool 12 comprising the fixed and movable jaws 22, 24 and guide rods 40. Moreover, this permits the hydraulic cylinders 20 to be installed onto the core portion of the tool 12 at a later time once the tool 12 is arranged in-place about a swage fitting to be installed. In combination with the retaining nuts 46, the shoulder bolt 56 can enable a relative arrangement between the hydraulic cylinders 20 and the fixed and movable jaws 22, 24.

In the illustrated embodiment, each of the jaws 22, 24 is generally U-shaped and includes a raised member or ridge 90. As will be described in more detail below, the ridges 90 of the jaws 22, 24 can be used to engage one of (i) a raised member (also referred to herein as a radial flange) on a fitting body or (ii) an end of a swage ring. Thus, the movable jaw 24 and the fixed jaw 22 can together engage the swage ring and fitting body for purposes of forcibly moving the swage ring onto the fitting body with a fluid conduit or the like received therein when the movable jaw 24 is moved or closed toward the fixed jaw 22. Generally, although not necessarily, the ridge 90 on the fixed jaw 22 engages the raised member of the fitting body and the ridge 90 on the movable jaw 24 engages the end of the swage ring. In such an application, movement of the movable jaw 24 under a hydraulic force forcibly moves the swage ring onto the connector body to seal and mechanically connect the connector body to the fluid conduit received therein.

As shown, a bridge member 100 can be removably secured to each of the jaws 22, 24 and thereby can form a portion of each of the respective jaws. The details of the bridge members 100 and manner in which they are secured to respective jaws 22, 24 is generally the same or similar and will only be described in further detail with reference to the movable jaw 24. However, it is to be appreciated by those skilled in the art that the bridge member 100 (the first bridge member) of the fixed jaw 22 can be and can function the same or similarly to the bridge member (the second bridge member) of the movable jaw 24. As illustrated, the movable jaw bridge member 100 extends across the open end of the U-shaped jaw 24 and thereby provides a circumferentially continuous structure for encircling and/or engaging a fitting. That is, the bridge members 100, together with the fixed and movable jaws 22, 24, circumferentially surround a fitting and corresponding conduit received in the jaws.

More particularly, bridge member 100 includes opposed slots 102, 104 extending along lateral sides 106, 108 thereof for receiving the U-shaped ridge 90 of the jaw 24 to axially lock the bridge member relative to the jaw. The removable connection of the bridge member allows for detachment from the jaw 24 when desirable to remove or install a fitting component, swage ring or connector body within the jaw 24 and reattachment when desirable to encircle the fitting component and operate the installation tool 12 thereon.

Figure 4:
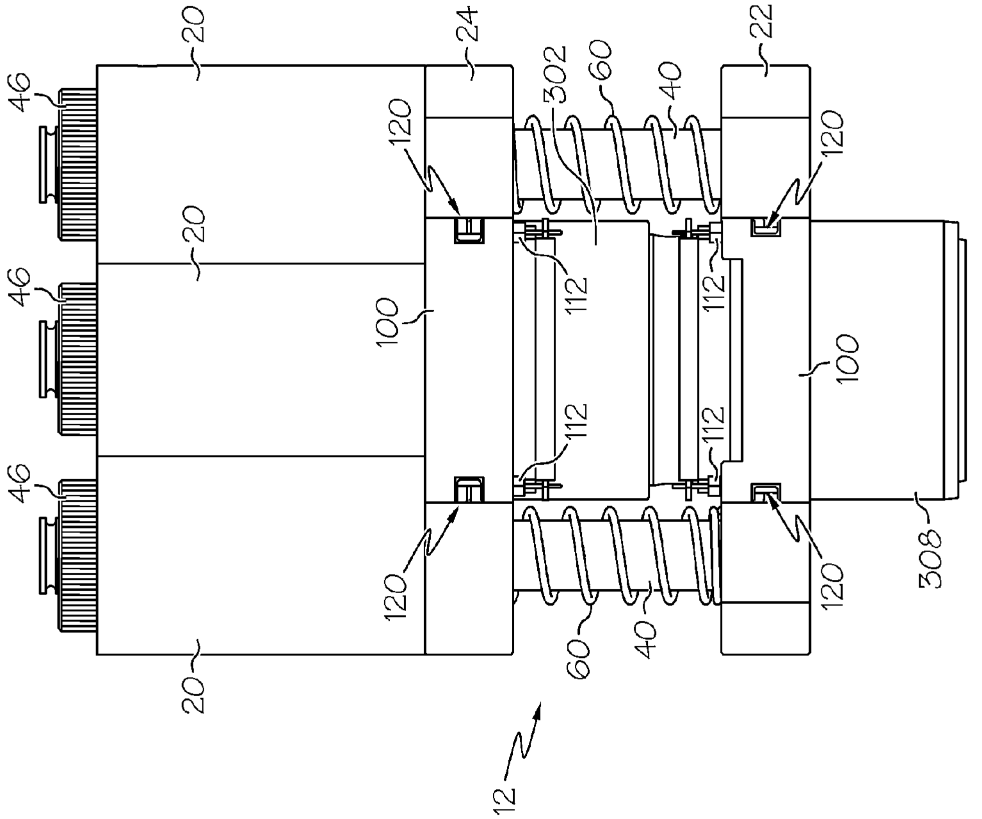
FIG. 4 is a top view of the example installation tool.

The bridge member 100, also referred to herein as an insert or a jaw insert, includes a raised member or ridge portion 110 (see FIG. 3) that, like the ridges 90 of the jaws, can be used to engage one of (i) a raised member on a fitting body and (ii) an end of a swage ring. The bridge member 100 includes a locking mechanism that can be used to selectively secure and lock the bridge member 100 to the movable jaw 24, particularly to restrict radial removal of the bridge member 100 from the jaw 24. In the illustrated embodiment, with further reference to FIGS. 4 and 7, the locking device is a pair of spring plunger assemblies 112 for selectively securing and locking the bridge member 100 to the movable jaw 24, as will be described in more detail below. Of course, as will be appreciated by those skilled in the art, other types of locking devices could be employed, including locking devices provided on the jaw for locking to the bridge member, provided on the bridge member for locking to the jaw, such as the illustrated plunger assemblies 112, and/or provided on both the bridge member and the jaw.

Each spring plunger assembly 112 can be generally similar to that disclosed in U.S. Pat. No. 7,984,538, the entire disclosure of which is incorporated herein by reference thereto. Generally, each spring plunger assembly 112 includes a threaded plug having a hexagonal head threaded shaft portion. In the illustrated embodiment, the threaded shaft portion is threadedly engaged to a body portion of the bridge member. The plunger assembly further includes a plunger 120 having a shaft portion received through an aperture in the head, a head appropriately sized to be larger than the aperture and limit axial movement of the plunger 120 into the head, and a plunger portion disposed on an end of the shaft portion opposite the head.

The ridges 90 on each of the jaws 22, 24 can be provided with apertures, such as notches 130, located adjacent both ends of each ridge 90. The notches 130 can be appropriately sized for selective receipt of the plungers 120 of the spring plunger assemblies 112. Further, ends of the ridges can be provided with opposed tapered surfaces for guiding the plunger portion toward the retracted position when the bridge member 100 is installed onto the jaw 24. A lanyard can be provided for connecting pull rings 128 disposed on a common bridge member 100. The lanyard can enable quick and simultaneous (or almost simultaneous) removal of the plunger portions from their respective notches 130 against the urging of the respective plunger springs.

With reference now to FIGS. 7-8, the installation tool 12 can be used for axially moving a swage ring 300 onto a fitting or connector body 302 (together the swage ring 300 and the connector body 302 comprise an associated swage ring fitting 300, 302) to sealingly and mechanically connect the fitting to an associated fluid conduit 304. In operation, the fitting 300, 302 is provided with the swage ring 300 partially installed on the connector body 302 and the fluid conduit 304 received through both the connector body 302 and the swage ring 300 as illustrated in FIG. 7. In the illustrated embodiment, the fitting 300, 302 is shown with a second fluid conduit 306 already secured to the connector body 302 by a second swage ring 308, as will be understood and appreciated by those skilled in the art.

With the bridge members 100 removed from their respective jaws 22,24, the subassembly, comprising the fitting 300, 302 and the fluid conduit 304, is positioned within the installation tool 12, and particularly the jaws 22, 24 of the installation tool 12 as shown. That is, in the illustrated embodiment, the connector body 302 is positioned on the fixed jaw 22 such that fixed jaw ridge 90 resides outside of the connector body's radial flange 310 and the swage ring 300 is positioned on the movable jaw 24 such that movable jaw ridge 90 resides outside of the swage ring's end surface 312. Thus, the radial flange 310 and the swage ring 300 are positioned between the ridges 90 of the fixed and movable jaws 22, 24 such that movement of the movable jaw 24 toward the fixed jaw 22 can result in axial movement of the swage ring 300 toward the radial flange 310.

Once the subassembly 300, 302, 304 is installed or positioned in the installation tool 12, the bridge members 100 can be secured to the jaws 22, 24. That is, each bridge member 100 can be slidably received onto its respective jaw 22, 24. More particularly, the opposed slots 102, 104 of the bridge member 100 receive opposed ends of the ridge 90 of the corresponding jaw 22 or 24 upon which the bridge member is being installed. One of the opposed tapered surfaces can forcibly move the spring plunger assembly 112 against the urging of its spring to its unlocked position allowing the bridge member to be fully slidably moved along the ridge 90. The opposed tapered surfaces are provided on both sides of the ridge 90 to allow for insertion of the spring plunger assembly into the notch 130 from either side of the ridge 90.

When the bridge member 100 is fully installed, i.e., the plunger 120 is aligned with the notch 130, the spring plunger assembly 112 lockingly engages the jaw and secures the bridge member 100 to the jaw. As illustrated, the ridge portion 110 of the bridge member 100 can be aligned with the ridge 90 for engaging a respective one of the radial flange 310 and the swage ring end surface 312. Once installed, the bridge members 100, together with their respective jaws 22, 24, circumferentially surround the fitting 300, 302 and the conduit 304.

With the subassembly 300, 302, 304 installed in the installation tool 12 and the bridge members 100 secured to the jaws 22, 24, the hydraulic cylinders 20 can be installed onto the installation tool 12. While it can be beneficial to install the hydraulic cylinders 20 last, it is understood that some or all of the hydraulic cylinders 20 can be installed at any time while using the tool 12. Each hydraulic cylinder 20 is slidingly installed (see FIG. 9) over a respective guide pin until the operating face 32 of the piston 30 is adjacent or in abutment with the movable jaw 24. The retaining nut 46 (or other retainer) is installed onto the second end 45 of the guide pin 40 to thereby fix the position of the hydraulic cylinder 20 relative to the fixed and/or movable jaws 22, 24.

Once all of the hydraulic cylinders 20 are installed, the hydraulic source 14 can be actuated to generate hydraulic pressure through hydraulic fluid and transfer this through the hose assembly 16 to the installation tool 12. More particularly, hydraulic fluid is forced under pressure by the pump 14, through the hose assembly 16 and into the installation tool 12. The pressurized hydraulic fluid is capable of moving the pistons 30 in the direction of arrow A, and thereby moving the movable jaw 24 toward the fixed jaw 22, also in the direction of arrow A, to effect a swaging operation on the fitting 300, 302 received between the jaws 22, 24.

As already described, the bridge member 100 attached to the movable jaw 24, which can be said to form a circumferential continuous movable jaw 24, 100, moves with the movable jaw 24, as indicated by arrow A. Moving the sets of pistons 30 to move the jaw 24 moves the movable jaw 24 toward the fixed jaw 22 and axially moves the swage ring 300 onto the connector body 302, as indicated by arrow A, to mechanically and sealingly connect the connector body 302 to the fluid conduit 304. Once the fitting 300, 302 is secured to the conduit 304, the pump 14 can be deactivated to allow hydraulic fluid to return from the hydraulic cylinders 20 and thereby allow the springs 60 to return the movable jaw 24 to its position spaced apart from the fixed jaw 22. Where a second swage ring is to be coupled to the connector body 302 for a second pipe (e.g., swage ring 308 and pipe 306), the installation tool 12 can be removed, rotated, and reinstalled about the second swage ring, and operated accordingly, as described previously herein.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A hydraulic installation tool, comprising:

a fixed jaw;

a movable jaw movable relative to the fixed jaw;

a plurality of independent hydraulic cylinders each comprising a body and a piston extendable outwards from the body that is configured to engage the movable jaw, movement of the pistons in a first direction towards an extended position causing the movable jaw to translate toward the fixed jaw, wherein each said hydraulic cylinder is a hollow plunger type with a central bore extending through the body and the piston of the hydraulic cylinder;

a plurality of guide rods independent from said hydraulic cylinders and comprising a first end and a second end, the first end being secured to the fixed jaw, and the second end extending completely through the central bore of a respective one of the plurality of hydraulic cylinders to project outwards therefrom, and wherein the movable jaw is disposed between the fixed jaw and the plurality of hydraulic cylinders for translational movement along the guide rods when the pistons move towards the extended position; and a plurality of retaining members each removably coupled to an associated one of the plurality of guide rods about the second end, wherein each said hydraulic cylinder is independently removable from the associated guide rod upon removal of the associated retaining member from said guide rod, and wherein the first end of each said guide rod remains secured to the fixed jaw when the associated hydraulic cylinder is independently removed from said guide rod.

2. The hydraulic installation tool of claim 1, wherein at least one of said retaining members is a retaining nut that is configured to threadingly engage the second end of one of the plurality of guide rods.

3. The hydraulic installation tool of claim 1, wherein at least one of said retaining members is a pin that is configured to be at least partially received by the second end of one of the plurality of guide rods.

4. The hydraulic installation tool of claim 1, further comprising at least one spring urging the pistons in a second direction opposite the first direction, the urging by the at least one spring moving the movable jaw apart from the fixed jaw unless a hydraulic fluid provides sufficient force against the pistons to overcome the urging of the at least one spring.

5. The hydraulic installation tool of claim 4, wherein the at least one spring is disposed about one of the plurality of guide rods and between the fixed and movable jaws.

6. The hydraulic installation tool of claim 1, wherein the first end of at least one guide rod is secured to the fixed jaw via a press fit.

7. The hydraulic installation tool of claim 1, further comprising at least one shoulder bolt secured to the fixed jaw and comprising a shoulder surface configured to engage the movable jaw to limit a separation distance between the fixed and movable jaws.

8. The hydraulic installation tool of claim 1, wherein the fixed and movable jaws are configured to engage and axially force a swage ring onto a fitting body to connect and seal the fitting body to a fluid conduit received in the fitting body.

9. The hydraulic installation tool of claim 8, furthering comprising first and second bridge members, the first bridge member removably connected to the fixed jaw and the second bridge member removably connected to the movable jaw, the first and second bridge members, together with the fixed and movable jaws, circumferentially surrounding the fitting and the conduit.

10. The hydraulic installation tool of claim 1, wherein the plurality of hydraulic cylinders comprises three hydraulic cylinders arranged in a generally triangular configuration.

11. A hydraulic installation tool for advancing a fitting's swage ring onto a fitting's connector body while a conduit is received in the connector body to mechanically and sealingly connect the fitting to the conduit, comprising:

a fixed jaw;

a movable jaw movable relative to the fixed jaw;

a plurality of independent and self-contained hydraulic cylinders each comprising a body and a piston extendable relative to the body that is configured to engage the movable jaw, movement of the pistons in a first direction causing the movable jaw to translate toward the fixed jaw;

a plurality of guide rods independent from said hydraulic cylinders and comprising a first end secured to the fixed jaw and a second end selectively insertable into the body of one of the hydraulic cylinders so that the second end projects a distance outward from said body, the movable jaw receiving the plurality of guide rods to be slidable thereon and being disposed between the fixed jaw and the plurality of hydraulic cylinders for translational movement along the guide rods; and a plurality of retaining members each removably coupled to an associated one of the plurality of guide rods about the second end, wherein each retaining member further comprises an abutment surface for abutment with an exterior portion of the associated hydraulic cylinder to retain and clamp the hydraulic cylinder between the retaining member and the movable jaw, and wherein each said hydraulic cylinder is independently removable from the associated guide rod upon removal of the associated retaining member from said second end of the guide rod, and wherein the first end of each said guide rod remains secured to the fixed jaw when the associated hydraulic cylinder is independently removed from said guide rod.

12. The hydraulic installation tool of claim 11, further comprising at least one spring urging the pistons in a second direction opposite the first direction, the urging by the at least one spring moving the movable jaw apart from the fixed jaw unless a hydraulic fluid provides sufficient force against the pistons to overcome the urging of the at least one spring.

13. The hydraulic installation tool of claim 11, further comprising at least one shoulder bolt secured to the fixed jaw and comprising a shoulder surface configured to engage the movable jaw to limit a separation distance between the fixed and movable jaws.

14. A hydraulic installation tool for advancing a fitting's swage ring onto a fitting's connector body while a conduit is received in the connector body to mechanically and sealingly connect the fitting to the conduit, comprising:

a fixed jaw;

a movable jaw movable relative to the fixed jaw;

a plurality of independent hydraulic cylinders each comprising a body and a piston extendable outwards from the body that is configured to engage the movable jaw, movement of the pistons in a first direction causing the movable jaw to translate toward the fixed jaw;

a plurality of guide rods comprising a first end secured to the fixed jaw and a second end configured to extend into one of the hydraulic cylinders, the movable jaw being disposed between the fixed jaw and the plurality of hydraulic cylinders for translational movement along the guide rods; and a plurality of retaining members each removably coupled to an associated one of the plurality of guide rods about the second end to thereby clamp the associated hydraulic cylinder between the retaining member and the movable jaw and resist at least 20 tons of force applied by the piston of the hydraulic cylinder, wherein each said hydraulic cylinder is independently removable from the associated guide rod upon removal of the associated retaining member from said guide rod, and wherein the first end of each said guide rod remains secured to the fixed jaw when the associated hydraulic cylinder is independently removed from said guide rod.

15. The hydraulic installation tool of claim 14, wherein the second end of each of the plurality of guide rods extends completely through a central bore of a respective one of the plurality of hydraulic cylinders to project outwards therefrom for engagement with one of the retaining members.

16. The hydraulic installation tool of claim 14, wherein at least one of said retaining members is a retaining nut that is configured to threadingly engage the second end of one of the plurality of guide rods.

* * * * *